(12) United States Patent
Fu et al.

(10) Patent No.: US 10,975,245 B2
(45) Date of Patent: Apr. 13, 2021

(54) METHOD FOR PREPARING SELF-DISPERSING NANO CARBON BLACK BASED ON A THIOL-ENE CLICK REACTION

(71) Applicants: Shaohai Fu, Wuxi (CN); Liping Zhang, Wuxi (CN); Liangan Wang, Wuxi (CN); Chunxia Wang, Wuxi (CN); Min Li, Wuxi (CN)

(72) Inventors: Shaohai Fu, Wuxi (CN); Liping Zhang, Wuxi (CN); Liangan Wang, Wuxi (CN); Chunxia Wang, Wuxi (CN); Min Li, Wuxi (CN)

(73) Assignee: Jiangnan University, Wuxi (CN)

( * ) Notice: Subject to any disclaimer, the term of this patent is extended or adjusted under 35 U.S.C. 154(b) by 97 days.

(21) Appl. No.: 16/178,299

(22) Filed: Nov. 1, 2018

(65) Prior Publication Data
US 2019/0194471 A1   Jun. 27, 2019

(30) Foreign Application Priority Data

Dec. 22, 2017 (CN) .......................... 201711404948.3

(51) Int. Cl.
| C09C 1/44 | (2006.01) |
| C09C 1/56 | (2006.01) |
| C09C 3/08 | (2006.01) |
| D01F 1/04 | (2006.01) |

(Continued)

(52) U.S. Cl.
CPC ............... *C09C 1/565* (2013.01); *C09C 1/56* (2013.01); *C09C 3/08* (2013.01); *D01F 1/04* (2013.01); *B82Y 30/00* (2013.01); *C01P 2004/04* (2013.01); *C01P 2004/64* (2013.01); *C01P 2006/22* (2013.01)

(58) Field of Classification Search
CPC .. C09C 1/565; C09C 1/56; C09C 1/48; C09C 1/44; C09C 3/06; C09C 3/08; C09C 1/00; D01F 1/04
USPC ................................. 106/400, 401, 472, 478
See application file for complete search history.

(56) References Cited

U.S. PATENT DOCUMENTS

| 2012/0026240 A1* | 2/2012 | Saito .................... C09D 11/322 347/21 |
| 2014/0203219 A1* | 7/2014 | Nishijima ................. C09C 1/56 252/510 |
| 2018/0251595 A1* | 9/2018 | King ....................... C09C 1/565 |

OTHER PUBLICATIONS

Wang, L. et al. Preparation and characterization of aqueous phase self-dispersed CB/PSSS composites. Colloids and Surfaces A: Physicochemical and Engineering Aspects, [s. l.], v. 533, p. 33-40, 2017. (Year: 2017).*

(Continued)

*Primary Examiner* — James E McDonough
(74) *Attorney, Agent, or Firm* — Lili Chen

(57) ABSTRACT

Disclosed is a method for preparing self-dispersing nano carbon black based on a thiol-ene click reaction. A sol-gel technique is used to graft a coupling agent containing a carbon-carbon double bond onto the surface of the carbon black, and a functional molecular chain is grafted onto the surface of the carbon black by a thiol-ene click reaction with a mercapto compound. The self-dispersing nano carbon black is obtained after centrifugation, washing and drying. The method is simple and easy to operate, has a high grafting rate, and can prepare self-dispersing nano carbon black adaptable to different systems by selecting mercapto compounds with different functional groups.

7 Claims, 4 Drawing Sheets

(51) Int. Cl.
   C04B 14/00        (2006.01)
   B82Y 30/00        (2011.01)

(56) References Cited

OTHER PUBLICATIONS

Bag, Dibyendu S., et al. "Chemical functionalization of carbon nanotubes with 3-methacryloxypropyltrimethoxysilane (3-MPTS)." Smart materials and structures 13.5 (2004): 1263. (Year: 2004).*

Zabihi, O. et al. One-pot synthesis of aminated multi-walled carbon nanotube using thiol-ene click chemistry for improvement of epoxy nanocomposites properties. RSC Advances, [s. l.], n. 119, p. 98692, 2015. (Year: 2015).*

Wang et al., "Preparation and characterization of aqueous phase self-dispersed CB/PSSS composites, Colloids and Surfaces A: Physiochemical and Engineering Aspects", [s. l.], v. 533, p. 33-40, 2017. (Year: 2017).*

Bag et al., "Chemical functionalization of carbon nanotubes with 3-methacryloxypropyltrimethylsilane (3-MPTS)." Smart Materials and Structures 13.5 (2004): 1263. (Year: 2004).*

Zabihi et al. "One-pot synthesis of animated multi-walled carbon nanotube using thiol-ene click chemistry for improvement of epoxy nanocomposites properties." RSC Adavnces, [s. l.], n. 119, p. 98692, 2015. (Year: 2015).*

* cited by examiner

METHOD FOR PREPARING SELF-DISPERSING NANO CARBON BLACK BASED ON A THIOL-ENE CLICK REACTION

CROSS-REFERENCES AND RELATED APPLICATIONS

This application claims the benefit of priority to Chinese Application No. 201711404948.3, entitled "A Method for Preparing Self-dispersing Nano Carbon Black Based on a Thiol-Ene Click Reaction", filed Dec. 22, 2017, which is herein incorporated by reference in its entirety.

BACKGROUND OF THE INVENTION

Field of the Invention

The present invention relates to a method for preparing self-dispersing nano carbon black based on a thiol-ene click reaction, which belongs to the technical field of fine chemicals.

Description of the Related Art

Carbon black has excellent colorability, weather resistance, reinforcing performance and chemical stability, and is rich in source and low in price. It is one of the most important black colorants and has been widely used in various industries such as rubber, paint and ink. However, due to the small particle size, large specific surface area and easy agglomeration, carbon black particles cannot be easily dispersed in various media stably. These defects limit the performance of the carbon black, and have become a major problem in the application of carbon black. Therefore, enhancing the dispersion stability of carbon black in a dispersion medium has become a research hotspot.

Self-dispersing carbon black is a novel coloring material developed in recent years, has the characteristics of convenient transportation and simple use, and has received wide attention. At present, self-dispersing carbon black is mainly prepared by the following methods. (1) Grinding and dispersing with the aid of a dispersing agent: the method is simple in process and convenient for industrialization. For example, Wang Shirong et al enabled pigments to be stably dispersed in an aqueous system by using a styrene-acrylic copolymer pigment dispersant. However, since the added dispersant is physically adsorbed on the surface of the carbon black, its adsorption-desorption equilibrium may be broken by external conditions, and the desorption behavior may cause the carbon black particles to reaggregate. (2) Oxidation modification: the surface of carbon black is oxidized by chemical or physical methods to increase the content of acidic oxygen-containing groups (such as carboxyl groups and hydroxyl groups) on the surface of carbon black to enhance its dispersibility in an aqueous solvent. For example, Yang Xinyu et al. used the liquid phase oxidant nitric acid to oxidize the surface of carbon black to prepare nano carbon black with a self-dispersing function. However, since the number of introduced carboxyl groups and hydroxyl groups is not enough, the molecular chain of the group is not long enough and the degree of ionization is low, it is insufficient in the solvent to provide sufficient repulsive force to achieve stable dispersion of the carbon black. (3) Coating modification: this method generally uses carbon black as the core and water-soluble or oil-soluble polymer as the coating material, and the polymer is deposited on the surface of the carbon black by phase separation, surface polymerization, spray drying and the like to form microcapsules. For example, the patent No. CN102532939A discloses a method of coating and modifying an organic pigment by a spray drying method using a hydrophilic copolymer, and the coated organic pigment has good self-dispersibility in an aqueous phase. However, the pigment microcapsules prepared by this method have a large particle size, and most of them are not in the nanometer range. (4) Graft modification: the graft modification of the carbon black surface is carried out by grafting a polymer chain onto the surface of the carbon black. One end is firmly bonded to the surface of the carbon black, and the other end is extended in the solvent medium to provide sufficient repulsive force and steric hindrance to counteract the strong Van der Waals forces between the particles for easy dispersion. For example, the patent No. CN101855302A discloses a self-dispersing pigment prepared by modification of the pigment surface by covalent bonding. Although the carbon black surface graft polymer is proved to be an effective way to prepare self-dispersing carbon black, most of the existing grafting techniques have complex reaction processes, low grafting rate, and self-polymerization of monomers.

The present invention provides a method for preparing self-dispersing nano carbon black by introducing a double bond on the surface of carbon black and then modifying the surface of carbon black by a thiol-ene click reaction. By adopting the method of the invention, the defects of low grafting rate and self-polymerization phenomenon of the existing carbon black grafting technology can be effectively avoided; and a functional molecular chain can be grafted on the surface of the carbon black to increase the compatibility between the carbon black and the solvent medium to achieve good self-dispersion of the carbon black in the solvent.

SUMMARY OF THE INVENTION

The object of the present invention is to develop a nano carbon black with good self-dispersing ability in an aqueous phase system, an oil phase system, an NMMO solvent system and a high electrolyte system. The nano carbon black of the present invention meets the requirements of dope dyeing of viscose fiber, Lyocell fiber and acrylic fiber NaSCN systems, polylactic acid fiber and the like for carbon black. It can prevent the fiber structure, mechanical properties and morphology from being damaged due to the addition of other substances such as dispersants and wetting agents during the dispersion. In addition, the problems of traditional color paste transportation, storage difficulty and environmental pollution are also solved by the present invention.

The first object of the present invention is to provide a self-dispersing nano carbon black prepared based on a thiol-ene click reaction. The self-dispersing nano carbon black is obtained by oxidatively modifying carbon black using a liquid phase oxidant to obtain an oxidized carbon black, then introducing a coupling agent containing a carbon-carbon double bond onto the surface of the oxidized carbon black, and finally grafting a functional molecular chain onto the surface of the carbon black by connection with a mercapto compound through a thiol-ene click reaction. The mercapto compound can comprise a hydrophilic or hydrophobic functional group linked to a thiol group.

In one embodiment of the present invention, the carbon black is one of furnace black, channel black and pyrolysis black.

In one embodiment of the present invention, the coupling agent containing a carbon-carbon double bond is a silane coupling agent, a titanate coupling agent, an organic complexing coupling agent or an aluminate compound.

In one embodiment of the present invention, the coupling agent containing a carbon-carbon double bond is KH-570, A171, KH-A172 or A151.

In one embodiment of the present invention, the liquid phase oxidant is a nitric acid solution, a hydrogen peroxide solution, a saturated ammonium persulfate solution, perchloric acid, a sodium hypochlorite aqueous solution, an isocyanate solution or a potassium permanganate solution.

In one embodiment of the present invention, the water-soluble mercapto compound is mercapto hexanol, mercapto nonanol, mercapto octanol, mercapto decanol, mercapto undecyl alcohol, mercapto hexanoic acid, mercapto nonanoic acid, mercapto octanoic acid, mercapto decanoic acid, mercapto undecanoic acid, mercapto hexylamine, mercapto nonyl amine, mercapto octyl amine, mercapto decyl amine, mercapto undecyl amine, mercapto hexyl sulfonic acid, mercapto nonyl sulfonic acid, mercapto octyl sulfonic acid, mercapto decyl sulfonic acid, mercapto undecyl sulfonic acid, hexanedithiol, nonanedithiol, octanedithiol, decanedithiol and sodium mercaptosulfonate. The oily mercapto compound is a mercaptoalkane or a mercaptoester.

In one embodiment of the present invention, the mercapto compound is added in an amount of 10-100% by mass of the carbon black.

A second object of the present invention is to provide a method for preparing the self-dispersing nano carbon black. The method comprises the following steps: (1) oxidatively modifying carbon black by using a liquid phase oxidant to obtain an oxidized carbon black; adding the oxidized carbon black into a coupling agent alcohol solution, dispersing to a nanometer scale by a dispersion means, adding a certain amount of deionized water and a certain amount of alkaline agent, adjusting the pH value of the system to 8.5-9, transferring the whole reaction system into a reaction vessel, and reacting at 20-80° C. for 0.5-30 hr to obtain modified carbon black containing a double bond on the surface; and (2) adding an oily or water-soluble mercapto compound into the reaction vessel, heating to 50-90° C., dropwisely adding an initiator and keeping the temperature for 0.5-20 hr, centrifuging the dispersion at high speed, washing and drying the carbon black, grinding and pulverizing the dried carbon black powder by a pulverizer, and filtering to obtain the self-dispersing nano carbon black powder.

In one embodiment of the present invention, the mass fraction of the oxidized carbon black in the alcohol solvent is 0.1%-40%.

In one embodiment of the present invention, the alcohol solvent used for dissolving the coupling agent is methanol, ethanol, propanol, butanol, isopropanol, ethylene glycol or ethylene glycol monomethyl ether.

In one embodiment of the present invention, the dispersion means is high speed disperser dispersion, emulsifier dispersion, sand mill dispersion or ultrasonic cell pulverizer dispersion.

In one embodiment of the present invention, the alkaline agent is sodium hydroxide, sodium carbonate, sodium bicarbonate, ammonium hydroxide, triethylamine or triethanolamine.

In one embodiment of the present invention, the alkaline agent is added in an amount of 0.1-10% by volume of the alcohol solvent.

In one embodiment of the present invention, the deionized water is used in an amount of 10-100% by mass of the alcohol solvent.

In one embodiment of the present invention, the mercapto compound comprises a hydrophilic group linked to a thiol group, including mercapto hexanol, mercapto nonanol, mercapto octanol, mercapto decanol, mercapto undecyl alcohol, mercapto hexanoic acid, mercapto nonanoic acid, mercapto octanoic acid, mercapto decanoic acid, mercapto undecanoic acid, mercapto hexylamine, mercapto nonyl amine, mercapto octyl amine, mercapto decyl amine, mercapto undecyl amine, mercapto hexyl sulfonic acid, mercapto nonyl sulfonic acid, mercapto octyl sulfonic acid, mercapto decyl sulfonic acid, mercapto undecyl sulfonic acid, hexanedithiol, nonanedithiol, octanedithiol, decanedithiol and sodium mercaptosulfonate. In some embodiment, the mercapto compound comprises a hydrophobic group linked to a thiol group, for example, a mercaptoalkane or a mercaptoester.

In one embodiment of the present invention, the mercapto compound is used in an amount of 10-100% by mass of the oxidized carbon black.

In one embodiment of the present invention, the initiator is potassium persulfate, ammonium persulfate, sodium persulfate, azobisisobutyronitrile, 2,2'-azobis(isobutyramidine) dihydrochloride, 2,2'-azobis[2-(2-imidazolin-2-yl)propane] dihydrochloride or benzoyl peroxide.

In one embodiment of the present invention, the initiator is added in an amount of 0.5-15% by mass of the mercapto compound.

In one embodiment of the present invention, the high speed centrifugation may be performed at 5000-12000 rpm.

In one embodiment of the present invention, the washing is performed by using an alcohol/aqueous solution as the cleaning reagent, performing high speed centrifugation and removing the upper liquid. The washing process may be repeated 3 times.

In one embodiment of the present invention, the drying is performed by drying the washed modified carbon black in an oven at 80° C. for 24 hr.

A third object of the present invention is to provide a method of using the self-dispersing nano carbon black in the field of textiles. The self-dispersing nano carbon black of the present invention has good self-dispersing function in an aqueous phase system, an oil phase system, an NMMO solvent system and a high electrolyte system, and has favorable compatibility with spinning solutions of viscose fiber, Lyocell fiber and acrylic fiber, polylactic acid fiber and the like. It can prevent the fiber structure, mechanical properties and morphology to be damaged due to the addition of other substances such as dispersants and wetting agents during the dispersion. In practice, the prepared self-dispersing nano carbon black can be added to the corresponding spinning solvent and dispersed to the nanometer scale by a dispersion means (solid content is 5-20%) to obtain a carbon black dispersion; the carbon black dispersion is then mixed with the fiber spinning solution (the mass fraction of the carbon black dispersion to the spinning solution is 1-10%); and finally, the black fiber is obtained by spinning through a spinning machine.

The present invention uses a sol-gel technique to graft a coupling agent containing a carbon-carbon double bond on the surface of the carbon black, and a functional molecular chain is grafted onto the surface of the carbon black by a thiol-ene click reaction with a mercapto compound. The self-dispersing nano carbon black is obtained after centrifugation, washing and drying. The method has the benefits of having simple production process, easy operation and high grafting rate. It can prepare self-dispersing nano carbon black compatible with different systems by selecting mercapto compounds containing different functional groups.

DETAILED DESCRIPTION

Figure 1:
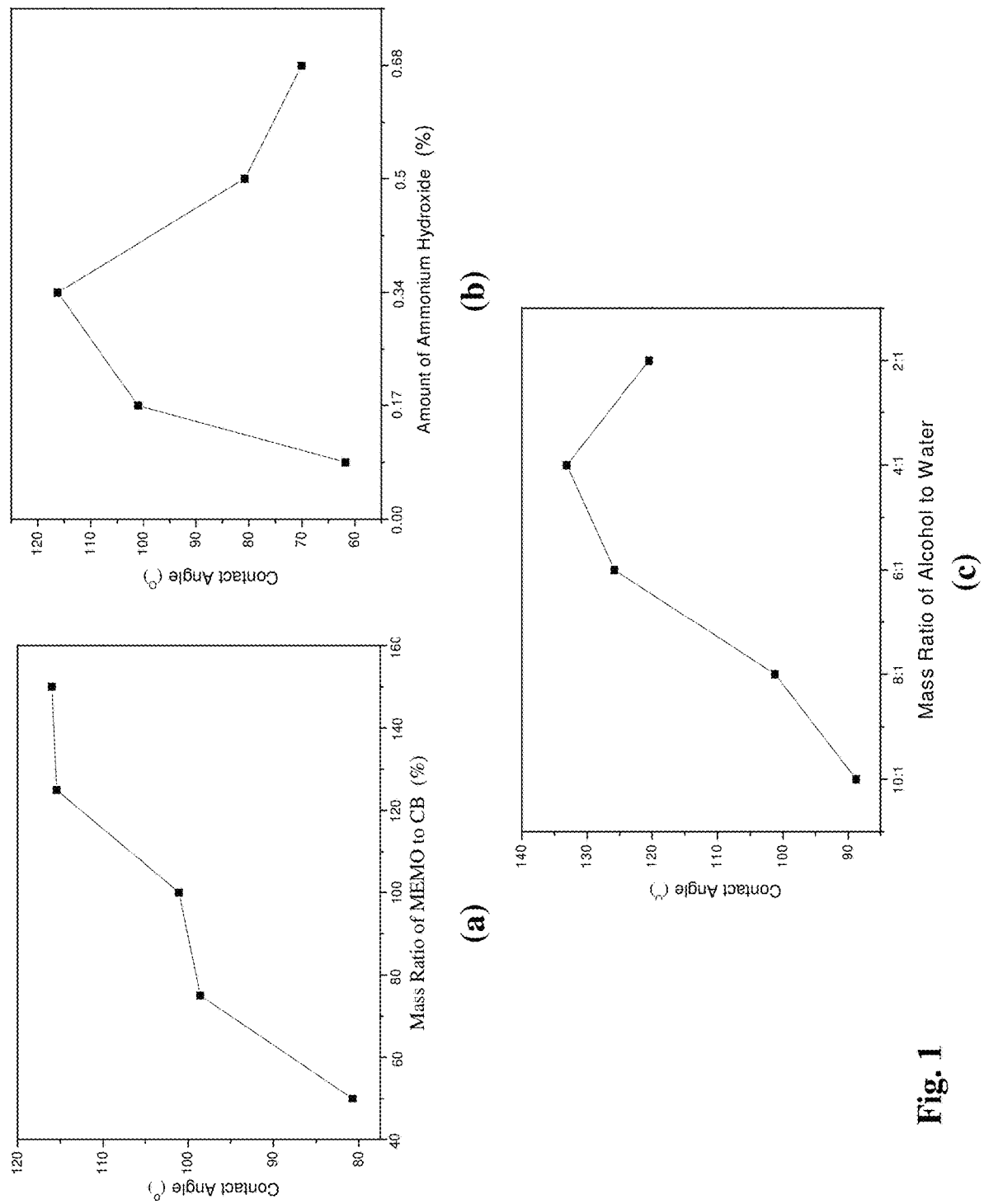
FIG. 1 Effects of the amount of MEMO (a), the amount of ammonium hydroxide (b) or the ratio of alcohol/water (c) on the contact angle of CB/MEMO.

The technical details of some embodiments of the present invention are further described and illustrated below with reference to the accompanying drawings in the following examples. The examples are described only for illustration purpose, not to limit the scope of the present invention which is defined by the claims hereafter.

Example 1

0.6 g of carbon black was treated with 60 g of a nitric acid solution (concentration of 30%) at 20° C. for 0.5 hr to obtain oxidatively modified carbon black. 1 g of silane coupling agent KH570 (MEMO) was weighed and dissolved in 90 g of ethanol solution, and 1 g of the oxidatively modified carbon black was added. The carbon black was dispersed into nanoparticles by an ultrasonic cell pulverizer, 10 g of deionized water was then added, and the pH value of the system was adjusted to 8.5 with ammonium hydroxide. The reaction system was transferred to a reaction vessel and reacted at 60° C. for 12 hr. After that, 0.5 g of sodium mercapto sulfonate (MPS) was added and the temperature was raised to 60° C. An initiator azodiisobutyronitrile accounting for 1% by weight of the monomer was added dropwisely and reacted for 3 hr. High-speed centrifugation, washing and drying were then performed. The dried carbon black powder was ground and pulverized by a pulverizer and filtered through a 200-mesh sieve to obtain a water-soluble self-dispersing nano carbon black pigment.

10 g of the water-soluble self-dispersing nano carbon black pigment was ultrasonically dispersed in 90 g of mixed solvent of NMMO (N-methylmorpholine-N-oxide) and water (the mass ratio of NMMO to water wss 87:13) to obtain a carbon black dispersion. 5 g of the carbon black dispersion was added to 95 g of Lyocell fiber spinning solution, stirred uniformly, and spun by a spinning machine to obtain black Lyocell fibers.

Example 2

4 g of carbon black was treated with 40 g of a hydrogen peroxide solution (concentration of 30%) at 60° C. for 2 hr to obtain oxidatively modified carbon black. 1.3 g of silane coupling agent KH570 was weighed and dissolved in 60 g of ethanol solution, and 8 g of the oxidatively modified carbon black was added. The carbon black was dispersed into nanoparticles by an ultrasonic cell pulverizer, and 30 g of deionized water was then added, and the pH value of the system was adjusted to 9 with sodium hydroxide. The reaction system was transferred to a reaction vessel and reacted at 40° C. for 24 hr. After that, 6 g of mercaptovinyl ester was added, and the temperature was raised to 75° C. An initiator azobisiso heptonitrile accounting for 5% by weight of the monomer was added dropwisely and reacted for 6 hr. High-speed centrifugation, washing and drying were then performed. The dried carbon black powder was ground and pulverized by a pulverizer and filtered through a 200-mesh sieve to obtain an oily self-dispersing nano carbon black pigment.

10 g of the oily self-dispersing nano carbon black pigment was ultrasonically dispersed in 90 g of dichloromethane to obtain a carbon black dispersion, and 3 g of the carbon black dispersion was added to 95 g of polylactic acid fiber spinning solution, stirred uniformly, and spun by a spinning machine to obtain black polylactic acid fibers.

Example 3

4 g of carbon black was treated with 40 g of perchloric acid solution at 50° C. for 2 hr to obtain oxidatively modified carbon black. 2.5 g of silane coupling agent A151 was weighed and dissolved in 50 g of ethanol solution, 5 g of the oxidatively modified carbon black was added, the carbon black was dispersed into nanoparticles by an ultrasonic cell pulverizer, then 25 g of deionized water was added, and the pH value of the system was adjusted to 8.5 with ammonium hydroxide. The reaction system was transferred to a reaction vessel and reacted at 40° C. for 24 hr. After that, 1.5 g of mercaptopropionic acid was added, and the temperature was raised to 75° C. An initiator azodiisobutyronitrile accounting for 2% by weight of the monomer was added dropwisely and reacted for 10 hr. High-speed centrifugation, washing and drying were then performed, and the dried carbon black powder was ground and pulverized by a pulverizer and filtered through a 200-mesh sieve to obtain an water-soluble self-dispersing nano carbon black pigment.

10 g of the water-soluble self-dispersing nano carbon black pigment was ultrasonically dispersed in 90 g of mixed solvent of sodium hydroxide, urea and water (the mass ratio of sodium hydroxide to urea to water is 7:12:81) to obtain a carbon black dispersion, and 2 g of the carbon black dispersion was added to 95 g of viscose fiber spinning solution, stirred uniformly, and spun by a spinning machine to obtain black viscose fibers.

Example 4

8 g of carbon black was treated with 40 g of a saturated ammonium persulfate solution at 100° C. for 10 hr to obtain oxidatively modified carbon black. 20 g of silane coupling agent KH-A172 was weighed and dissolved in 100 g of ethanol solution, 40 g of the oxidatively modified carbon black was added. The carbon black was dispersed into nanoparticles by an ultrasonic cell pulverizer, then 90 g of deionized water was added, and the pH value of the system was adjusted to 8.5 with triethanolamine. The reaction system was transferred to a reaction vessel and reacted at 80° C. for 30 hr. After that, 20 g of mercapto propanol was added, the temperature was raised to 90° C. An initiator azobisisoheptonitrile accounting for 4% by weight of the monomer was added dropwisely and reacted for 20 hr. High-speed centrifugation, washing and drying were then performed, and the dried carbon black powder was ground and pulverized by a pulverizer and filtered through a 200-mesh sieve to obtain an oily self-dispersing nano carbon black pigment.

10 g of the oily self-dispersing nano carbon black pigment was ultrasonically dispersed in 90 g of dichloromethane to obtain a carbon black dispersion, and 5 g of the carbon black dispersion was added to 95 g of polylactic acid fiber spinning solution, stirred uniformly, and spun by a spinning machine to obtain black polylactic acid fibers.

TABLE 1

Dispersion stability of self-dispersing nano carbon black samples prepared in Examples 1-4 and color properties of corresponding applied fibers

| Example | Particle Size (nm) | Particle Size Distribution | $S_S$ (days) | $S_T$ | $S_C$ | K/S |
|---|---|---|---|---|---|---|
| 1 | 170.1 | 0.195 | 60 | 98 | 96 | 34.5 |
| 2 | 220.5 | 0.122 | 30 | 85 | 90 | 23.3 |
| 3 | 240.9 | 0.104 | 51 | 95 | 95 | 31.3 |
| 4 | 190.0 | 0.136 | 42 | 87 | 93 | 25.3 |

Preparation of Carbon Black Dispersion:

10 g of raw carbon black and 10 g of self-dispersing nano carbon black pigment prepared in each Example were respectively dispersed into 90 g of the corresponding solvent, and subjected to ultrasonic treatment by ultrasonic cell pulverizer for 30 min (power: 400W) to respectively obtain carbon black dispersions before and after modification.

Note: $S_S$ (storage stability): the dispersions of the carbon black pigment with and without modification were placed in a transparent sample bottle. The occurrence time of precipitation at the bottom of the bottle was recorded as the $S_S$ time.

$S_T$ (heat stability): 2 mL of the carbon black dispersion was taken and placed at 60° C. for 2 hr, 1 mL of the upper dispersion was taken and diluted to a certain multiple. The particle sizes of the carbon black dispersions before and after the placement treatment were tested, and the heat stability was calculated according to Equation 1.

$S_C$ (centrifugal stability): 2 mL of carbon black dispersion was taken, placed in a Centrifuge 5415D high-speed centrifuge and centrifuged at 3000 r/min for 30 min. After the centrifugation was finished, 1 mL of the upper dispersion was taken and diluted to a certain multiple. The particle sizes of the carbon black dispersions before and after centrifugation was tested respectively. The centrifugal stability was calculated according to Equation 2.

$$S_T = \left(1 - \frac{|d_0 - d_T|}{d_0}\right) \times 100\% \qquad \text{Eq. (1)}$$

$$S_C = \left(1 - \frac{|d_0 - d_C|}{d_0}\right) \times 100\% \qquad \text{Eq. (2)}$$

wherein $d_0$ represents the particle size of the untreated carbon black dispersion (unheated or uncentrifuged), $d_T$ represents the particle size of the carbon black dispersion after being placed at different temperatures, and $d_C$ represents the particle size of the carbon black dispersion after being centrifuged at different centrifugal speeds.

K/S (the color yield of the dope-dyed fiber) was measured by an X-RITE 8400 computer color measuring and matching instrument using a D65 light source at an observation angle of 10°. Different points were taken on the dyed cotton fabric and tested for three times, the average was used to calculate the K/S value according to Equation 3:

$$\frac{K}{S} = \frac{(1-R)^2}{2R} - \frac{1-R_0}{2R_0} \qquad \text{Eq. (3)}$$

wherein $R_0$ and $R$ are the reflectivities of un-dyed cotton fabric and dyed cotton fabric, respectively.

Optimized Experimental Process and Results of Water-Soluble Self-Dispersing Nano Carbon Black CB/MPS-g-MEMO in Example 1:

γ-methacryloxypropyltrimethoxysilane (MEMO) was grafted onto the surface of carbon black by a sol-gel technique, and connected with sodium 3-mercapto-1-propane sulfonate (MPS) by a thiol-ene click reaction to prepare the water-soluble self-dispersing carbon black particles CB/MPS-g-MEMO. The effects of the amount of MEMO, the amount of ammonium hydroxide and the ratio of alcohol/water in the system on the contact angle of MEMO modified carbon black were investigated. The effects of the amount of MPS, reaction time and reaction temperature on the properties of CB/MPS-g-MEMO particles were investigated.

Contact angle test: the contact angle of the sample to water was tested by using a Krüss DSA100 contact angle plotter, and the sample was tableted before the test.

Figure 2:
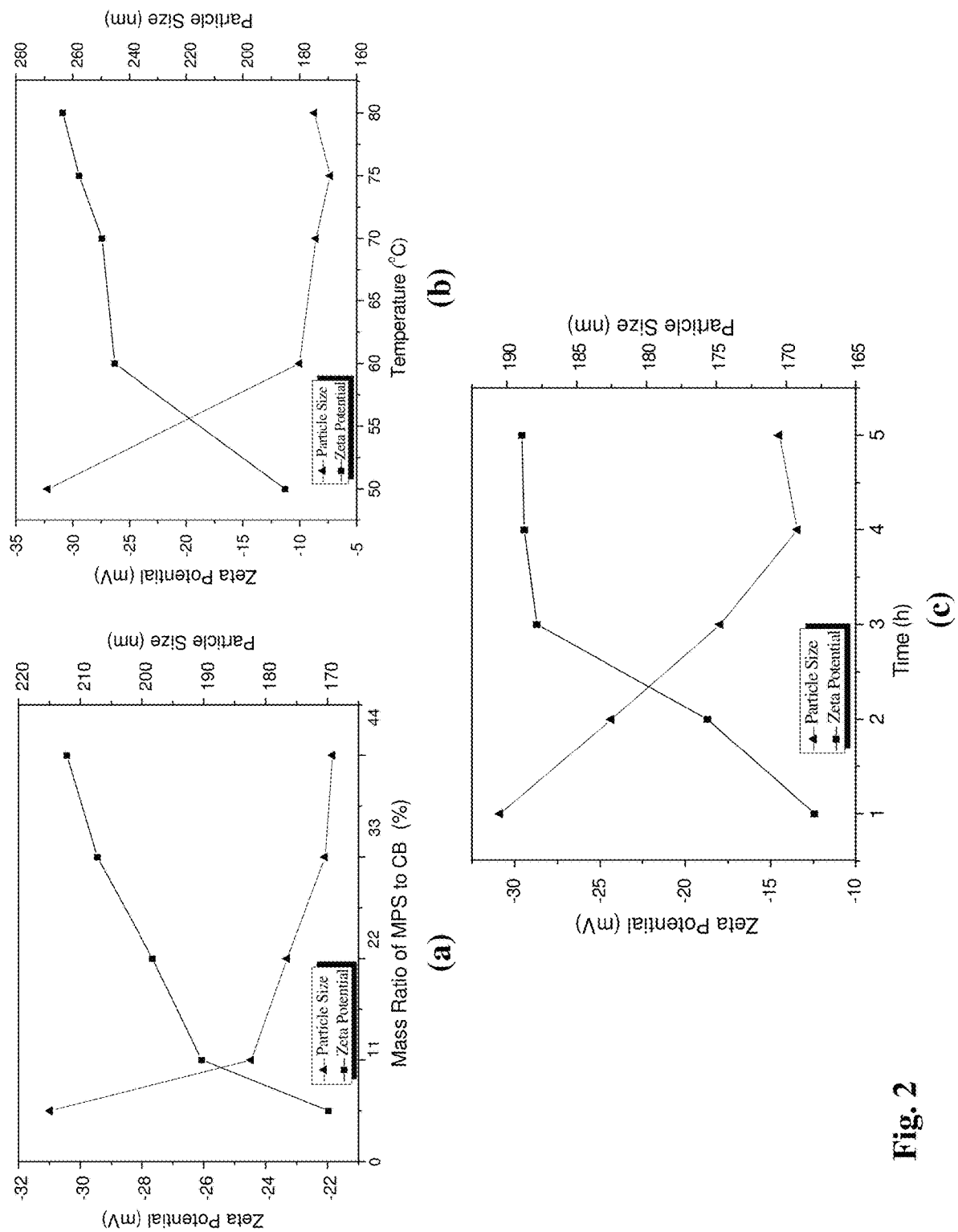
FIG. 2 Effects of amount of MPS (a), reaction temperature (b) or the reaction time (c) on Zeta potentials and particle size of CB/MPS-g-MEMO.

As shown in FIGS. 1 and 2, a preferred preparation process of MEMO-modified carbon black is as follows: the mass ratio of MEMO to oxidized carbon black is 125%, the mass ratio of ammonium hydroxide to the system is 0.34%, and the ratio of alcohol/water in the system is 4:1. The system herein refers to a reaction system, including a solvent, the carbon black and other reactants. A preferred preparation process of CB/MPS-g-MEMO is as follows: the mass ratio of MPS to CB/MEMO is 30%, the reaction temperature is 75° C., and the reaction time is 4 hr.

Figure 3:
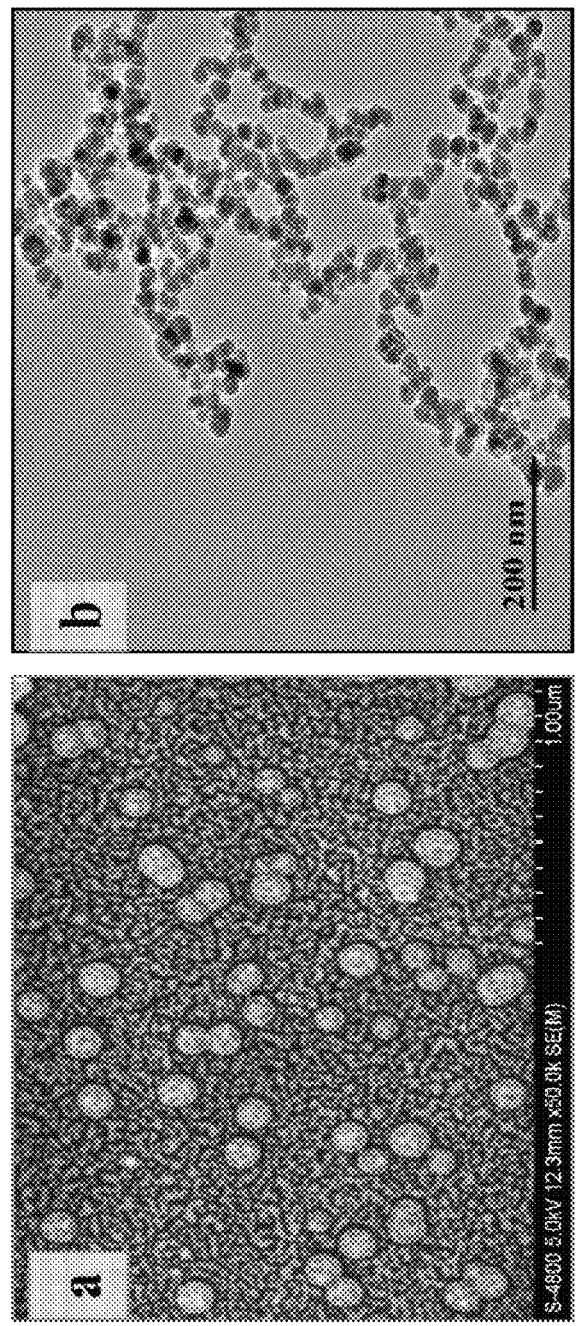
FIG. 3 SEM (a) and TEM (b) images of CB/MPS-g-MEMO.

As shown in FIG. 3, the particle size of CB/MPS-g-MEMO in the solvent is small, and the dispersion effect was remarkably improved. TEM photographs show that CB/MPS-g-MEMO has a core-shell structure.

The results in FIGS. 1-3 have shown that surface modification of carbon black by thiol-ene click method is an effective way to improve the dispersion stability in dispersion media. After modification, the surface of the carbon black is grafted with sulfonated polysiloxane, and the extending of the hydrophilic segment in the solvent increases the electrostatic repulsion between the carbon black particles, thereby preventing the mutual aggregation of the carbon black particles.

The Lyocell fiber was subjected to dope dying with a CB/MPS-g-MEMO dispersion by the method described in Example 1, and the results are shown in Table 1 below:

TABLE 2

Effects of CB/MPS-g-MEMO content on color properties of Lyocell fiber

| Carbon Black % (w/w, Carbon Black/ Lyocell Fiber) | K/S | Rubbing Fastness/Grade | | Washing Fastness/Grade | |
|---|---|---|---|---|---|
| | | Dry | Wet | Discoloration | Staining |
| 1 | 25.09 | 4-5 | 4 | 5 | 4-5 |
| 1.5 | 30.04 | 4-5 | 4 | 5 | 4-5 |
| 1.8 | 32.63 | 4-5 | 4 | 5 | 4-5 |
| 2 | 34.23 | 4-5 | 4 | 5 | 4-5 |
| 3 | 34.56 | 4 | 3-4 | 5 | 4-5 |

Figure 4:
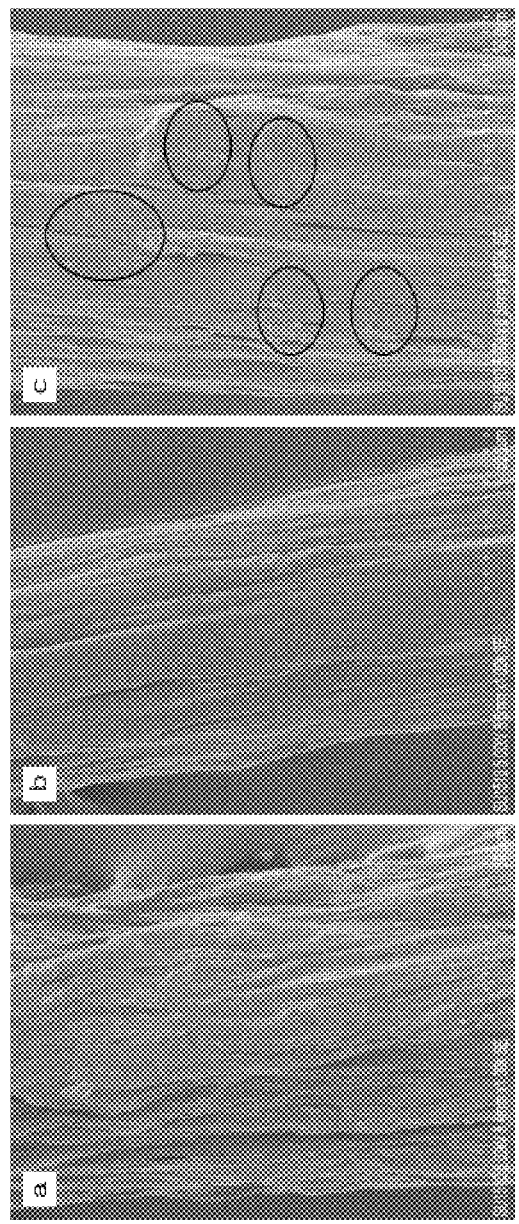
FIG. 4 SEM photograph of Lyocell fiber with 0% carbon black (a), 2% (w/w) carbon black (b), or 4% (w/w) carbon black (c).

The results in Table 2 indicate that the K/S value of the dyed Lyocell fiber increases as the carbon black content increases. When the mass fraction of carbon black content to fiber is 2%, the K/S value of the dyed Lyocell fiber approaches the maximum, and does not increase to much with the further increase of the carbon black content. In addition, when the mass fraction of carbon black in the Lyocell fiber is less than 2%, the dope-dyed Lyocell fiber has high rubbing fastness and washing fastness. This is because the carbon black is endowed with a large surface adsorption energy due to abundant unsaturated carbon atoms on the surface. Since the nano carbon black has a small particle size and a large specific surface area, the contact area between the carbon black and the fiber molecules is large, and the acting force is strong, thereby preventing the carbon black from falling off the fiber surface. However, when the carbon black content is high, there are many carbon black particles on the surface of the dyed Lyocell fiber, so the rubbing fastness is lowered (see FIG. 4). When the carbon black mass fraction is 2%, the carbon black is filled between the Lyocell fibers to reduce the "gutters" of the fiber surface, and when the carbon black content is high, the amount of carbon black deposited on the surface of the fiber is increased.

In summary, the self-dispersing CB/MPS-g-MEMO prepared by the present invention has good self-dispersibility in the NMMO system, and can be applied to the stock coloring of the Lyocell fiber that has excellent color performance.

What is claimed is:

1. A method for preparing a self-dispersing nano carbon black, comprising:
   1) oxidatively modifying carbon black using a liquid phase oxidant to obtain an oxidized carbon black;
   2) using a coupling reaction to obtain a modified carbon black containing a double bond on the surface, wherein the oxidized carbon black is dispersed into a coupling agent alcohol solution to a nanometer scale and react at 20-80° C., pH 8.5-9.0 adjusted by an alkaline agent, for 0.5-30 hr;
   3) adding a functional group to the modified carbon black containing a double bond by a thiol-ene click reaction, wherein a mercapto compound is added to the modified carbon black containing a double bond, and an initiator is stepwisely added to initiate the thiol-ene click reaction; and
   4) obtaining the self-dispersing nano carbon black after centrifugation, washing and drying.

2. The method of claim 1, wherein the thiol-ene click reaction is performed at 50~90° C. for 0.5 to 20 hours.

3. The method of claim 1, wherein the oxidized carbon black is added in an amount of 0.1%-40% by mass of the coupling agent alcohol solution.

4. The method of claim 1, wherein the alkaline agent is added in an amount of 0.1-10% by volume of the coupling agent alcohol solution.

5. The method of claim 1, wherein the initiator is selected from the group consisting of potassium persulfate, ammonium persulfate, sodium persulfate, azobisisobutyronitrile, 2,2'-azobis(isobutyramidine) dihydrochloride, 2,2'-azobis[2-(2-imidazolin-2-yl)propane] dihydrochloride and benzoyl peroxide; and wherein the initiator is added in an amount of 0.5-15% by mass of the mercapto compound.

6. The method of claim 1, wherein the coupling agent is selected from the group consisting of a silane coupling agent, a titanate coupling agent, an organic complexing coupling agent and an aluminate compound.

7. The method of claim 1, wherein the liquid phase oxidant is a nitric acid solution, a hydrogen peroxide solution, a saturated ammonium persulfate solution, perchloric acid, a sodium hypochlorite aqueous solution, an isocyanate solution or a potassium permanganate solution.

* * * * *